United States Patent [19]
White

[11] 3,965,235
[45] June 22, 1976

[54] METHOD OF MAKING A LOW FRICTION BUSHING

[76] Inventor: Charles S. White, 35815 - 42nd St., East, Palmdale, Calif. 93550

[22] Filed: Apr. 8, 1974

[21] Appl. No.: 458,559

Related U.S. Application Data

[63] Continuation-in-part of Ser. No. 321,566, Jan. 8, 1973, Pat. No. 3,891,488, which is a continuation-in-part of Ser. No. 76,110, Sept. 28, 1970, abandoned.

[52] U.S. Cl. .............................. 264/294; 264/137; 264/255; 264/257; 264/266; 264/271; 264/320
[51] Int. Cl.² ........................................... B29G 7/00
[58] Field of Search ........... 264/136, 137, 257, 258, 264/173, 174, 320, 332, 294, 322, 331, 255, 271, 266; 156/169, 173, 175, 194; 308/238, 240

[56] References Cited
UNITED STATES PATENTS

| | | | |
|---|---|---|---|
| 2,127,994 | 8/1938 | Davis et al. | 264/109 |
| 2,400,533 | 5/1946 | Buffington | 264/258 |
| 2,433,643 | 12/1947 | Beach et al. | 264/322 |
| 2,560,133 | 7/1951 | Schroeter | 308/238 |
| 2,614,058 | 10/1952 | Francis | 308/238 |
| 2,710,026 | 6/1955 | Stewart et al. | 264/137 |
| 2,967,796 | 1/1961 | Raffel | 264/314 |
| 3,000,076 | 9/1961 | Runton et al. | 308/238 |
| 3,342,917 | 9/1967 | Laskiewicz | 264/109 |
| 3,781,205 | 12/1973 | Cairns et al. | 252/12.6 |

*Primary Examiner*—Willard E. Hoag
*Attorney, Agent, or Firm*—Burton and Parker

[57] ABSTRACT

A low friction bushing is made by winding a continuous strand of bondable low friction thread impregnated with a bonding resin into the shape of a hollow cylinder having an axial length greater than the finished bushing. The cylinder is inserted into an annular cavity and with heat and pressure is axially compressed therewithin to radially expand it and compact the thread turns and fuse the resin into a solidified matrix with the thread and resin matrix completely filling the cavity and thereafter the solidified bushing is removed from the cavity. One of the cylindrical walls of the cavity is finished with a surface of bearing quality such that the surface of the bushing pressed thereagainst will be of a complementary quality.

4 Claims, 12 Drawing Figures

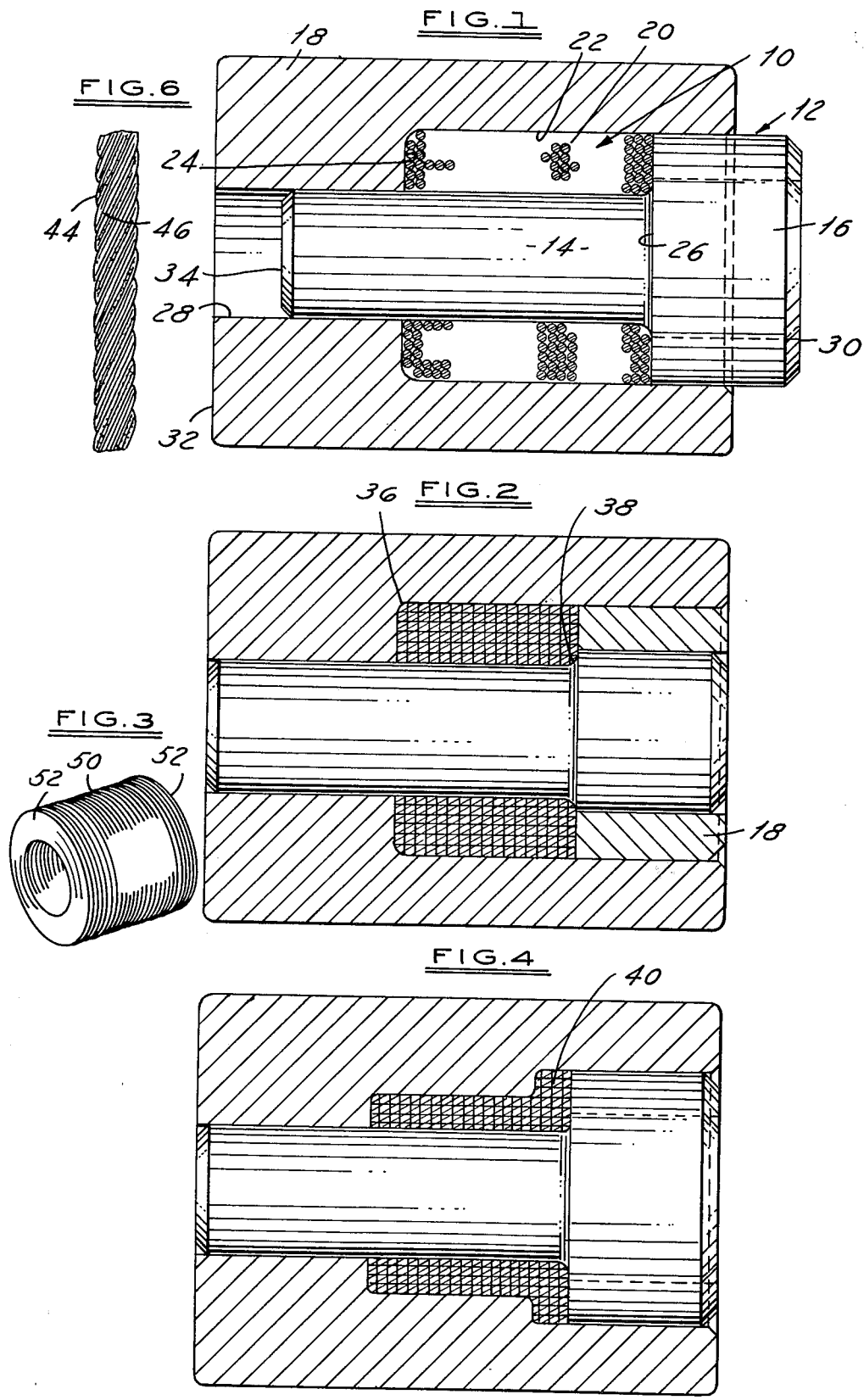

METHOD OF MAKING A LOW FRICTION BUSHING

RELATED APPLICATIONS

This application is a continuation-in-part of my application Ser. No. 321,566, filed Jan. 8, 1973, now U.S. Pat. No. 3,891,488 entitled LOW FRICTION BUSHING AND METHOD, which is a continuation-in-part of my application Ser. No. 76,110, filed Sept. 28, 1970, now abandoned entitled WINDING METHOD OF PRODUCING A LOW FRICTION SURFACE, and reference may also be made to my co-pending applications, Ser. No. 316,844, filed Dec. 20, 1972, and Ser. No. 317,111, filed Dec. 21, 1972, both now abandoned for additional discussion of low friction threads and their use.

FIELD OF INVENTION

This invention relates to the manufacture of low friction bushings and to bushings produced from the method and involves the construction of a bushing by the use of bondable low friction thread impregnated with a bonding resin with the thread being wound into a preform which is then compressed into desired configuration and the resin cured to solidify the same and integrate the thread turns.

BACKGROUND OF THE INVENTION

One common form of low friction bushing utilizing Teflon comprises a bonding resin impregnated fabric woven of Teflon threads and bondable threads which fabric is cut into strips of determined length and width, wrapped around a mandrel and then an overlay of resin and glass fibers is injection molded about the fabric to form a bushing. Instead of utilizing strips of fabric whose ends must be carefully matched to provide a smooth continuous bearing surface, U.S. Pat. No. 2,906,573 suggests that the Teflon and bonding threads may be woven into the form of a sleeve or tube and with a bonding resin may be secured to a metal surface to form a bushing. U.S. Pat. No. 2,953,418 suggested a bushing made by winding plural layers of a Teflon thread (surrounded by a helical winding of a bondable thread) helically onto a mandrel and then overwinding such layers with additional bondable thread, all such thread having been previously impregnated with a bonding resin. The wound structure is subjected to a resin curing temperature and the bondable thread portion of the structure is supposed to shrink and thereby apply a high pressure to the inner layers as the resin cures. While bushings made utilizing the fabric strips have enjoyed considerable commercial success, the other methods above mentioned have never become commercially successful.

Among the disadvantages of the bushings made utilizing the woven fabric strips are the problems in handling the strips and matching the cut edges to provide a continuous smooth bearing surface; the problem of attaining uniform resin impregnation of the fabric; and because of the foregoing and other problems the cost of such bushings is quite high. In the case of the other approaches to bushing manufacture mentioned above, structural integrity and uniformity of finished product could not be reliably attained.

SUMMARY OF THE INVENTION

According to the method disclosed herein a bondable low friction thread is impregnated with a bonding resin which is cured to the B-stage. The thread is helically wound into a preform having an axial length greater than the bushing to be formed, and then the preform is subjected to axial compression within an annular cavity and with heat the resin coalesces to integrate the structure in a solidified resin matrix with the thread turns at a cylindrical surface forming a low friction bearing surface for the bushing.

BRIEF DESCRIPTION OF THE DRAWINGS

FIG. 1 is a cross-sectional view through a mold showing the bushing in one stage of manufacture;

FIG. 2 is similar to FIG. 1 but shows the bushing in a final stage of manufacture;

FIG. 3 shows a completed bushing manufactured according to this disclosure;

FIG. 4 is a cross-sectional view through a mold showing the final stage of manufacture of a bushing having a peripheral end flange;

FIG. 6 is a magnified view of a short length of bondable low friction thread which is utilized in the manufacture of bushings according to this disclosure.

FIG. 7 shows the low friction thread as it passes through the coating solution;

FIG. 8 shows the low friction thread wound onto a mandrel;

FIG. 9 shows the wound mandrel of FIG. 8 as the bondable thread is partially cured; and FIG. 10 shows the final molding step of the partially cured bushing.

BRIEF DESCRIPTION OF PREFERRED EMBODIMENTS

Figure 5:
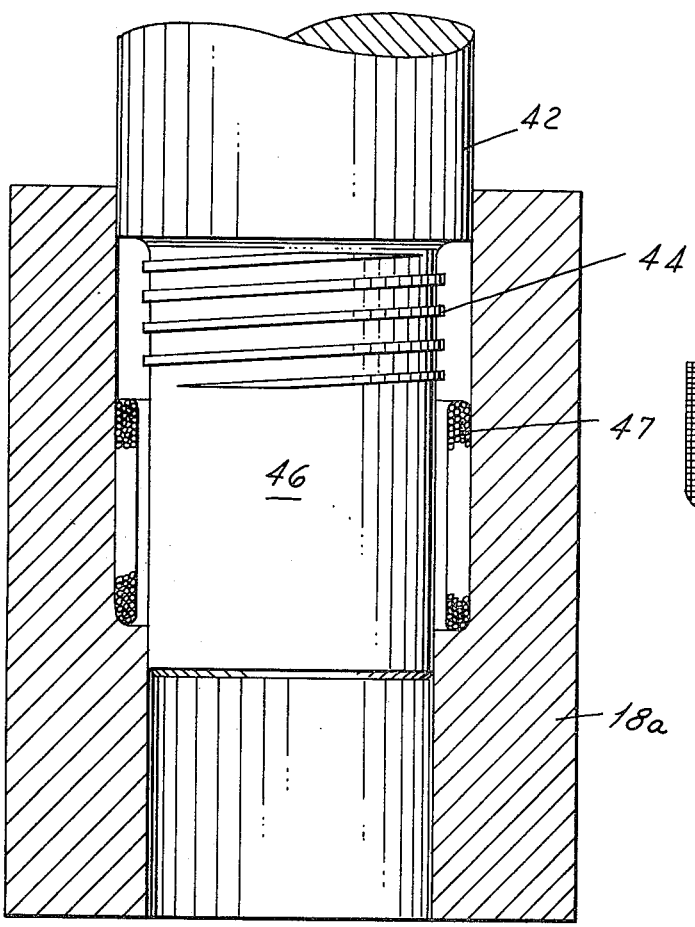
FIGS. 5 and 5A show two stages in the manufacture of a modified form of bushing, with the finished bushing being shown in 5B.

In the manufacture of bushings according to this disclosure bondable low friction thread is utilized. Such thread comprises low friction filaments such as fluorinated polyethylenes, such as Teflon (trademark for polytetrafluoro- ethylene), which are either twisted, braided or otherwise integrated with bondable fibers such as Dacron (trademark for a polyester), nylon, cotton or the like to form a composite thread structure. On the other hand the bondable low friction thread may be composed entirely of Teflon filaments which have been coated, as by vacuum plating, with a thin layer of metal, such as silver or the like to form a bondable surface on the fibers. The term "bondable low friction thread" as used in this disclosure is intended to cover either of the aforementioned types of low friction thread.

The bondable low friction thread is impregnated with a bonding resin such as a phenol formaldehyde, urea formaldehyde, melamine formaldehyde, urethane or other suitable bonding resin. This impregnation of the thread may be carried out in any suitable fashion, it being important that the bonding resin thoroughly impregnate the thread and that it be present in a determined thread-to-resin ratio, as for example 50 percent resin and 50 percent thread by weight. This ratio may be varied in accordance with the desired end characteristics of the bushing to be made.

Following impregnation of the thread with the bonding resin, the resin is cured to the B-stage. In such B-stage condition the resin is essentially free of any volatile solvents.

Such bondable low friction thread impregnated with the bonding resin cured to the B-stage is next wound into a preform comprising successive helically wound layers of the thread and in FIG. 1 I have shown such preform at 10. The number of helical turns of the thread must be predetermined in accordance with the desired wall thickness and axial length for the desired bushing. In FIG. 1 six layers of winding has been shown but this is to be understood as purely illustrative. The axial thread utilized may have a diameter of approximately 0.013 inches but this dimension may be varied as desired. The cross-sectional shape of the thread may be desirably circular but this too may be varied in accordance with experience.

The preform 10 may be made up in different fashions. For example, it may be wound on a winding mandrel and then transferred to the mold core 12 shown in FIG. 1, or it may be wound directly on a mold core 12. As shown in FIG. 1 the mold core comprises a shank portion 14 and a head portion 16. The head portion 16 may, if found necessary, include a knockout ring 18 as shown in FIG. 2. The shank portion 14 may be finished with a fine surface so that the resulting bushing will have a complementary fine bearing surface. Preferably the surface of the shank portion 14 should be highly polished.

The mold core 12 is axially reciprocable in a mold cylinder 18a which cooperates with the mold core to define an annular cavity 20 within which the preform 10 is axially compressed to be radially expanded into close conformity with the shank portion 14 defining the inner cylindrical wall of the cavity and the outer cylindrical wall 22 of the mold cylinder. Axial compression of the preform occurs between the bottom wall 24 of the mold cylinder and the underside 26 of the head portion 16 of the mold core.

The mold cylinder bottom wall 24 is provided with a through aperture 28 sized to smoothly receive and guide the mold core 12 during reciprocation with the mold cylinder. The outer periphery of the mold core head 16 is sized to closely cooperate with the cylindrical wall 22 of the cylinder cavity. The end face 30 of the mold core and the end face 32 of the mold cylinder provide thrust faces against which portions of a molding press may bear curing the manufacturing operation. The end face 34 of the mold core will serve as a stop to limit insertion of the mold core into the cylinder by abutting the platen or the like upon which the mold cylinder face 32 is supported in the molding press.

With the preform 10 on the mold core, the mold core is introduced into the mold cylinder to carry the preform 10 into the annular cavity defined by the cooperating mold core and mold cylinder elements. In FIG. 1 the preform is shown following introduction into the annular cavity and during axial compression therewithin. The mold cylinder 18a and the mold core 12 are heated in any suitable fashion to the curing temperature for the bonding resin. As the preform 10 is introduced into the annular cavity the heat of the cylinder and core elements will serve to soften the bonding resin impregnated in the bonadable low friction thread and allow compaction of the thread turns axially of the preform and at the same time under the influence of the axial compression will cause radial expansion of the preform both inwardly toward the mold core shank 14 as well as toward the encircling wall 22 of the cylinder. As the resin fully softens and coalesces the mold core 12 will fully enter the cavity 20 and the end face 34 will bottom against the press platen limiting further inward movement of the core.

It is to be understood that the number of turns of the low friction thread both axially as well as radially in the preform must be predetermined so that axial foreshortening and radial expansion will completely fill the annular cavity 20 to provide a final bushing following cure of the resin which will contain the desired proportion of thread in the bushing mass. During the axial compression and radial expansion of the preform, the thread turns are tightly compacted and closely conform to the configuration of the annular cavity. In this regard the cavity may desirably be provided with radiused corners at 36 and 38 which will facilitate subsequent insertion of the bushing within whatever housing is to contain it as well as insertion of the shaft within the bushing to be bearingly supported by the same.

The preform in the fully axially compressed condition shown in FIG. 2 is allowed to remain in the mold until the resin has fully cured to the C-stage whereupon the mold core is pushed out of the mold cylinder and the finished bushing removed from the core shank 14. If desired, the head portion 16 of the core may be provided with the knockout ring 18 which, as will be well understood by those skilled in the art, may be axially displaced relative to the mold core to shift the bushing axially along the shank 14 to remove it from the mold core. If necessary or desirable additional extracting means may be provided in the mold cylinder to facilitate removal of the bushing therefrom, such as extraction pins or the like, not shown.

As shown in FIG. 3 the bushing thus formed comprises a hollow cylindrical element composed of the low friction thread turns closely compacted together and stabilized as a unitary structure with the resin matrix bonding the turns together. The bearing surface will be, according to the foregoing disclosure on the inner bore of the bushing. It is apparent from the description of the method that the bearing surface could as well be on the exterior of the bushing.

In FIG. 4 I have shown a slightly different form of the bushing which may be made in a similar fashion to that above described. In this form of the bushing it is provided with an end peripheral flange portion 40. The preform will be wound similarly to that above described with a build up of thread turns in the area where the peripheral flange 40 is to be provided. The winding may be carried out in automatic winding equipment programmed to wind the proper length and number of layers of the thread turns and to dwell in an area at one end of the preform to build up the thread turns in the area of the peripheral flange to be formed.

Figure 5B:
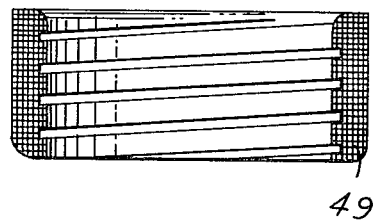
Figure 5A:
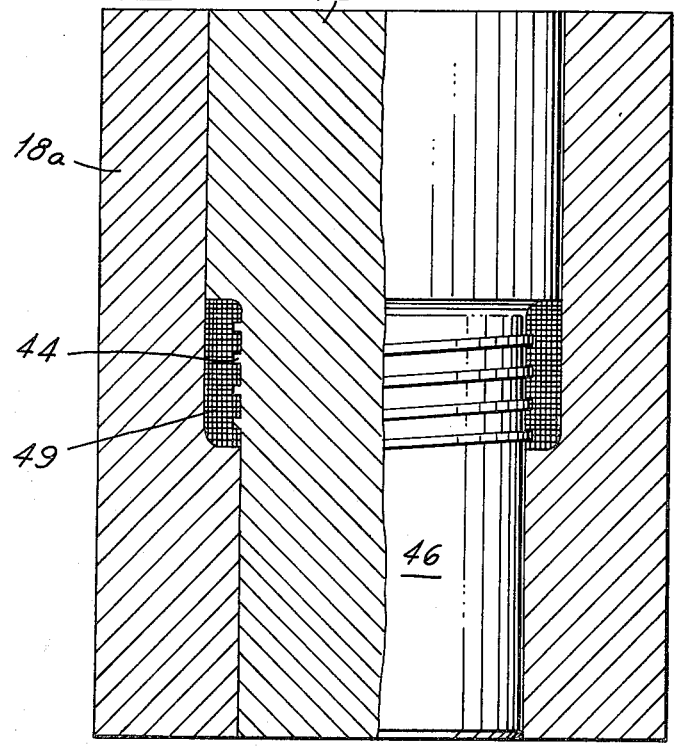

In FIG. 5B another form of bushing is disclosed. In this case the mold core 42 is provided with a helical thread form 44. The thread may be wound directly onto the shank of the mold core and over the helical thread 44, or it may, as shown in FIG. 5, be wound separately as a preform 47 sufficiently oversize the helical thread so that it may be inserted onto the mold core shank. Whichever approach is used, upon axial compression of the preform within the annular cavity defined by the cooperating core and cylinder elements, the preform is axially compressed and radially expanded to the final shape of the bushing as shown in FIG. 5A. Following curing of the resin the bushing may be removed from the mold core by simply twisting it relative to the core and the bushing 49 will be threaded off of the core and be of the configuration shown in FIG. 5B. As shown in FIG. 5 the preform 47 is disposed within the mold cylinder 18a and has an i.d. slightly oversize the crest diameter of the thread form 44 so that the shank of the mold core 42 may be axially inserted through the preform. In this method of molding, removal of the cured bushing from the mold cylinder is facilitated by virtue of the interengagement of the thread 44 with the bushing as shown in FIG. 5A.

In FIG. 6 I have shown in magnified form a thread or yarn typical of that which may be utilized in the method disclosed. As shown the thread comprises a yarn or strand formed of low friction thread such as Teflon thread 44 and bondable thread 46 which has been twisted together such that alternate turns of Teflon and bondable threads are presented. The impregnating bonding resin is applied to the thread to enter the interstices between the fibers and between the bondable and low friction thread elements. As shown in FIG. 6 the distribution of Teflon threads and bondable threads is substantially uniform. I have found that a ratio of 50 percent Teflon to 50 percent bondable fibers is quite satisfactory. The amount of resin-to-thread may be varied in accordance with the environments for the bushing. For example, where the bushing will be substantially entrapped within a metal housing, i.e. where the housing will encircle the cylindrical outer surface 50 as well as the ends 52, less resin may be utilized and therefore a higher content of thread in the mass of the bushing will be present and the bushing because of its entrapment within the metal housing will stand up to the intended usage. Where, on the other hand, the bushing will be entrapped to a lesser degree, a higher resin content may be desirable. The resin content will be dictated by the usage to which the bushing will be put and its environment as will be understood by those skilled in the art.

By virtue of the fact that the bushing is made from a continuous winding of bondable low friction thread, the upsetting action occurring within the annular cavity of the mold as the mold core is forced against the preform to cause axial reduction in the preform length will not adversely disturb the low friction thread at the cylindrical surfaces defined by the core shank 14 and the wall 22 as would be the case if the method is attempted using a woven low friction fabric disclosed in the prior art. By virtue of the method herein disclosed repeatedly uniform bearing surfaces in successive bushings may be obtained with bearing characteristics of predetermined quality. In other words, the proper amount and distribution of low friction thread will be present at the bearing surface formed on the bushing.

In winding the thread to create the preform, the thread may be wound as a single strand through successive helical turns and layers. On the other hand the thread may be wound in the form of a bundle of threads, such as two or more, and thereby the winding operation speeded up as it will require less turns to create the preform.

As mentioned above, the preform may be wound up separate from the core element 12. In such case the thread turns of the preform may be initially integrated so that the preform may be handled without the turns separating by heating the resin to some extent to cause a partial coalescing of the resin and a binding of the turns together. In the case where the thread is wound on the mold core directly, such may serve to obviate handling problems. It is within contemplation of the invention that the winding of the thread onto the mold core may occur in automatic equipment where successive mold cores are presented at a winding station and the thread wound onto the cores and the cores indexed through subsequent stations for insertion within the cylindrical mold element. On the other hand, the preforms may be wound separately from the molding operation and by suitable transfer equipment automatically brought to the molding station for insertion onto the mold core and carrying out of the forming operation hereinabove described.

Figure 7:
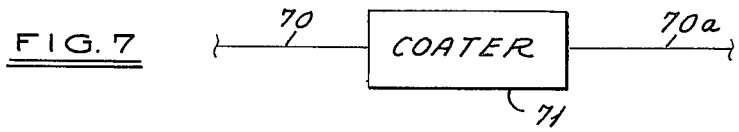
FIGS. 7–10 is an alternative process of preparing the desired bushing.

It is believed advantageous, especially in high volume production of low friction bushings, to employ a four step method in forming the bushings, such method being substantially shown in FIGS. 7–10. As shown in FIG. 7, the low friction thread 70 is first impregnated in the impregnating solution coater 71 and the resin cured to the B-stage. The thus coated thread is shown leaving the coater at 70a.

Figure 8:
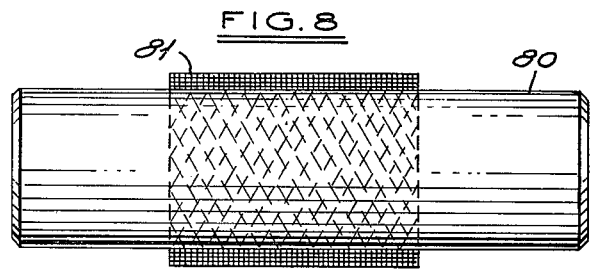

The second step of the method involves winding the thread onto a desired mandrel 80 shown in FIG. 8 as closely wound threads having three layers 81. It is to be appreciated that the number of layers of thread as shown is purely illustrative for the thickness of the layers will vary with the desired bushing.

Figure 9:
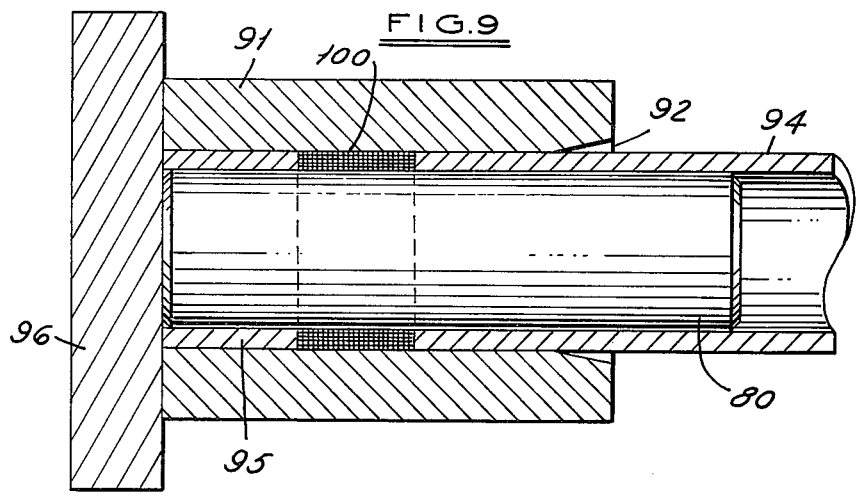

The third step involves a partial sizing and integrating of the thread turns through a cold fusing of the resin as a result of the application of substantial pressures to the wound preform. The wound mandrel 80 will have, for example, a sleeve 95 inserted over the nose of the mandrel. A second sleeve 94 will surround the other end portion of the mandrel. Sleeve 95 will protect the windings of the low friction thread as the mandrel is inserted into a preforming mold cylinder 91 having a tapered throat 92, generally of a conical shape. FIG. 9 shows a partial coalescing of the preform by the axial compression and radial expansion thereof within the mold cylinder 91 as the press ram (not shown) axially squeezes the preform between the sleeves 94 and 95 between the ram and the press platen 96.

The partial coalescing of the resin on adjacent thread turns occurs by the application of pressure. Such partial coalescing, or preform integrating step results in a compaction of the threads by application of pressures in the range of 10 to 20 thousand psia. Because the resin in the thread is at this stage cold and in a non-liquid form, the high pressures during compacting will not squeeze the resin out of the preform but rather will squeeze the thread turns tightly together expelling any entrapped gas and in a sense cold fusing the resin together. Examination of the compacted preform 100 following removal from the mold of FIG. 9, shows that the partially coalesced preform may be manually torn apart but there is a tendency of the thread turns to adhere one to the other. The thus formed compacted preform is sufficiently stable in configuration and has sufficient structural integrity so that it may be readily handled during subsequent treatment in carrying out the method herein disclosed.

Figure 10:
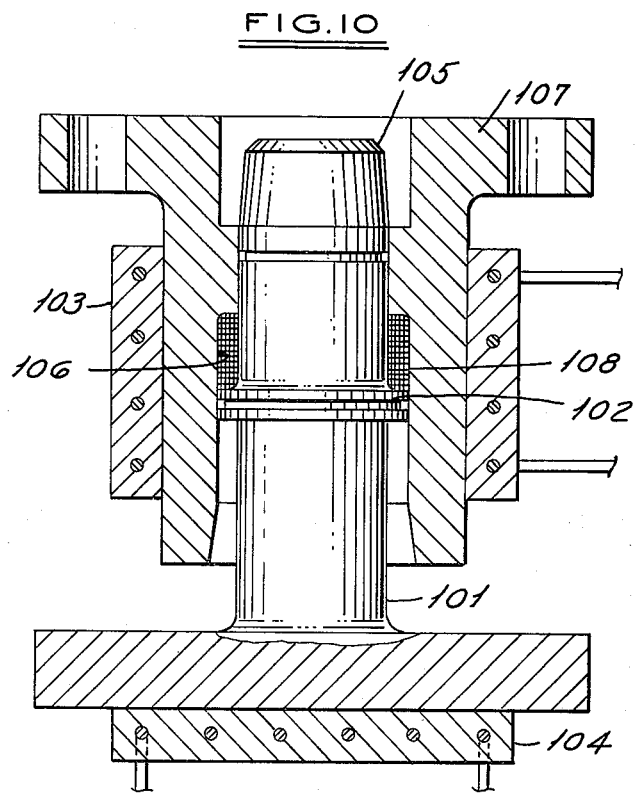

As the fourth step in the method, the preform 100 is mounted on a preheated mold core 101 shown in FIG. 10, having a tapered nose 105 and a knockout ring 102, and then inserted into the preheated mold cavity 106 of mold cylinder 107. Heating elements 103 and 104 associated with the core and mold members serve to heat them. The core 101 and mold are positioned between ram and platen portions of a suitable press (not shown) so that they may be urged together. As the resin on the thread softens, the core slides further into the mold cavity thereby finally sizing the bushing and with the heat causing C-stage curing of the resin. The bushing in its final cured condition is shown in FIG. 10 at 108.

The use of the preforming or partial integration step of FIG. 9 allows use of the method in high speed production to form bushings. If the low friction yarn (in B-stage) is wound on a mold core which must then be brought up to the appropriate curing temperature, too much time will be lost in raising the temperature. On the other hand, if the yarn is wound onto a hot mandrel, there will not be a uniform cure. Thus the use of the preforming or partial integration step allows the final cure to occur on a preheated mandrel within a preheated mold and yet still have uniformity throughout the bushing though the thread was initially wound onto an unheated mandrel.

Thus it will be seen I have disclosed an extremely simple method of manufacturing low friction bushings which will readily lend itself to high speed production as the prior art necessity of carefully cutting, trimming and fitting Teflon fabric is obviated and in addition the final bushing is of carefully controlled size, shape and density.

The difficulties of cutting, trimming and fitting is particularly evident in the manufacture of small diameter bushings, for example bushings having an i.d. of 1/16 or ¼ inch. Utilizing the process of the present invention, structural integrity and uniformity of finished products may be reliably attained.

What is claimed is:

1. A method of making a low friction bushing comprising the steps of:
    1. providing a bondable low friction thread impregnated with a bonding resin and cured to the B-stage, wherein the thread is comprised of bondable filaments and polytetrafluoroethylene filaments;
    2. winding a continuous strand of the impregnated bondable low friction thread into the shape of a hollow cylinder onto a mandrel thereby forming a wound mandrel;
    3. inserting said wound mandrel into a mold and axially compressing said hollow cylinder while cold to partially coalesce the resin and the thread turns into a preform;
    4. removing said preform from said mold and said mandrel;
    5. inserting said preform into a second mold;
    6. heating and axially compressing said preform to further compact the thread turns and to fuse the resin into a solidified C-staged matrix of predetermined size; and
    7. removing the thus formed bushing from the second mold.

2. The invention defined by claim 1 characterized in that one of the walls of the mold cavity is provided with a surface finish of bearing quality and the hollow cylinder is radially expanded against such surface to form a surface on the bushing complimenting the same.

3. The method of claim 1 wherein the strand of low friction thread is wound into the shape of a cylinder having an axial length greater than the finished bushing to be produced.

4. In a process for preparing low friction bushings wherein a continuous strand of bondable low friction thread impregnated with a bonding resin and cured to the B-stage is wound into the shape of a hollow cylinder on a mandrel thereby forming a wound mandrel, said hollow cylinder having an axial lengthy greater than the finished bushing to be produced and the cylinder is subjected to heat and pressure axially compressing the cylinder to radially expand it and compact the thread turns and fuse the resin into a solidified matrix, the improvement comprising the steps:
    1. inserting said wound mandrel into a mold and axially compressing said hollow cylinder while cold to partially coalesce the resin and the thread turns into a preform;
    2. removing said preform from said mold and said mandrel;
    3. inserting said preform into a second mold;
    4. heating and axially compressing said preform to further compact the thread turns and to fuse the resin into a solidified C-staged matrix of predetermined size; and
    5. removing the thus formed bushing from the second mold.

* * * * *